United States Patent
Miyake

(10) Patent No.: US 6,730,464 B2
(45) Date of Patent: May 4, 2004

(54) POLYVINYL ACETAL RESIN FOR HEAT-DEVELOPABLE PHOTOSENSITIVE MATERIAL AND HEAT-DEVELOPABLE PHOTOSENSITIVE MATERIAL

(75) Inventor: Yoshitaka Miyake, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 16 days.

(21) Appl. No.: 10/181,475

(22) PCT Filed: Jan. 19, 2001

(86) PCT No.: PCT/JP01/00337

§ 371 (c)(1),
(2), (4) Date: Sep. 17, 2002

(87) PCT Pub. No.: WO01/53357

PCT Pub. Date: Jul. 26, 2001

(65) Prior Publication Data

US 2003/0109636 A1 Jun. 12, 2003

(30) Foreign Application Priority Data

Jan. 19, 2000 (JP) .......................................... 2000-010535
Apr. 14, 2000 (JP) .......................................... 2000-113881
Nov. 6, 2000 (JP) .......................................... 2000-337893

(51) Int. Cl.[7] ...................... G03C 1/795; G03C 1/498; C08F 8/28; C08L 29/14
(52) U.S. Cl. ............................ 430/536; 525/57; 525/61
(58) Field of Search ...................... 525/57, 61; 430/536

(56) References Cited

U.S. PATENT DOCUMENTS 4,281,060 A * 7/1981 Usami et al. ............... 430/618

FOREIGN PATENT DOCUMENTS

JP 5-140211 A 6/1993
JP 5-155915 A 6/1993
JP 10-338713 A 12/1998

* cited by examiner

Primary Examiner—D. R. Wilson
(74) Attorney, Agent, or Firm—Sughrue Mion, PLLC

(57) ABSTRACT

The present invention has an object of the present invention to provide a polyvinyl acetal resin for heat-developable photosensitive materials as well as a heat-developable photosensitive material while solving such problems as coating solution pot life, coloration of heat-developable photosensitive material, fog, poor gradation, insufficient sensitivity and poor undeveloped film storability and making it possible for the materials to acquire good image characteristics.

The present invention is constituted of a polyvinyl acetal resin for heat-developable photosensitive materials
which is a polyvinyl acetal resin synthesized by the acetalization reaction between a polyvinyl alcohol and an aldehyde and
which comprises having a degree of polymerization of 200 to 3,000, a residual acetyl group content of 0 to 25 mole percent and a residual hydroxyl group content of 17 to 35 mole percent, as calculated while regarding one acetal group as two acetalized hydroxyl groups, a water content of not more than 2.5% by weight and a residual aldehyde content of not more than 10 ppm and is free of any antioxidant.

4 Claims, No Drawings

POLYVINYL ACETAL RESIN FOR HEAT-DEVELOPABLE PHOTOSENSITIVE MATERIAL AND HEAT-DEVELOPABLE PHOTOSENSITIVE MATERIAL

TECHNICAL FIELD

The present invention relates to a polyvinyl acetal resin for use in a heat-developable photosensitive material and to a heat-developable photosensitive material.

BACKGROUND ART

A heat-developable photosensitive material comprises a support and a composition applied thereto which is obtained by dispersing mainly a fatty acid silver salt and an organic reducing agent, optionally together with a small amount of a photosensitive silver halide, in a polymer binder.

The silver halides so far used widely are excellent in photographic characteristics, hence are utilized in high quality image forming materials. However, they have problems; the procedures in the steps of development and fixation are complicated and, since the above steps each involves wet treatment, not only troubles are caused by the complicated treatment works but also chemical waste liquid is discharged in large amounts.

For avoiding such problems, heat-developable photosensitive materials have been developed so that the development step may be carried out not in the manner of wet process but in the manner of heat-development, and have partly been put to practical use.

Thus, for example, Japanese Kokoku Publication Sho-43-004924 discloses a heat-developable photosensitive sheet material which comprises an organic silver salt containing, within the molecule, a group of associated silver ions, a silver halide catalytically contacting with the silver ions, and a slow reducing agent.

In the above-cited publication, it is described that the heat-developable photosensitive sheet material is formed by incorporating a photosensitive material comprising such organic silver salt, silver halide and slow reducing agent in a film or a fibrous product almost free of any binder, which serves as a transparent self-support, or by incorporating the above material in a coat layer of a film-forming binder, such as polyvinyl butyral, polymethyl methacrylate, cellulose acetate, polyvinyl acetate, cellulose acetate propionate or cellulose butyrate, and applying the resulting composition to a heat-resistance support, such as a paper sheet, plastic film, metal foil or glass sheet; and polyvinyl acetal resins are used and alleged to be most suitable as the above film-forming binder.

However, for reasons of production process, the conventional polyvinyl acetal resins contain minute amounts of impurities, and these impurities cause the film-forming binder itself to have photosensitivity, so that the following defects may be caused: the coat layer of the film-forming binder prepared may be colored unreasonably or, after application, images may undergo or show fog, poor gradation or deficient sensitivity, or the photosensitive sheet material may have poor storability before image forming. Depending on the glass transition temperature of the polyvinyl acetal resin, the film may undergo heat deformation in the step of heat-development, or images after application may show fog, poor gradation or deficient sensitivity, or cracking may occur during film handling, among others.

As means for solving the above problems of deterioration of image characteristics, the use of a thione compound represented by a general formula as the silver salt oxidizing agent in a thermal photographic composition containing a photosensitive silver halide, a reducing agent and a silver salt oxidizing agent is described in Japanese Kokai Publication Sho-49-052626, for instance, by which stable images can be formed without causing any independent stabilizer or stabilizer precursor to exist in the system. However, the use of such thione compound as the silver salt oxidizing agent can never solve the above-mentioned problems which the conventional polyvinyl butyral resins have.

Further, for improving image characteristics, it is said to be necessary that the fatty acid silver salt, organic reducing agent, photosensitive silver halide and other ingredients be dispersed more uniformly. However, when a polyvinyl acetal resin with a low degree of polymerization is used for making a point of the dispersibility, the resulting coat will be weak in strength and problems such as fog may arise. When, conversely, a polyvinyl acetal resin with a high degree of polymerization is used for satisfying the coat strength requirement, it becomes difficult to uniformly disperse the fatty acid silver salt, organic reducing agent and photosensitive silver halide therein.

Furthermore, among heat-developable photosensitive materials, heat-developable silver salt films are inferior in image characteristics, in particular image density and visibility of gradated portions, to the conventional X-ray sensitive films in which gelatin is used and which is processed by the wet method. Therefore, it is strongly demanded that the heat-developable silver salt films be improved with respect to these image characteristics. For that purpose, it is necessary to strictly control the nuclear growth of silver in the step of heating.

SUMMARY OF THE INVENTION

Accordingly, it is an object of the present invention to provide a polyvinyl acetal resin for heat-developable photosensitive materials as well as a heat-developable photosensitive material while solving such problems as coating solution pot life, coloration of heat-developable photosensitive material, fog, poor gradation, insufficient sensitivity and poor undeveloped film storability and making it possible for the materials to acquire good image characteristics.

The present invention provides a polyvinyl acetal resin for heat-developable photosensitive materials which is a polyvinyl acetal resin synthesized by the acetalization reaction between a polyvinyl alcohol and an aldehyde and which comprises having a degree of polymerization of 200 to 3,000, a residual acetyl group content of 0 to 25 mole percent and a residual hydroxyl group content of 17 to 35 mole percent, as calculated while regarding one acetal group as two acetalized hydroxyl groups, a water content of not more than 2.5% by weight and a residual aldehyde content of not more than 10 ppm and is free of any antioxidant.

In another aspect, the invention provides a polyvinyl acetal resin for heat-developable photosensitive materials which comprises two polyvinyl acetal resin species differing in degree of polymerization by at least 300 and which comprises having an apparent degree of polymerization of 200 to 1,000, an apparent residual acetyl group content of 0 to 25 mole percent and an apparent residual hydroxyl group content of 17 to 35 mole percent, as calculated while regarding one acetal group as two acetalized hydroxyl groups, a water content of not more than 2.5% by weight and a residual aldehyde content of not more than 10 ppm and is free of any antioxidant.

The polyvinyl acetal resin for heat-developable photosensitive materials according to the present invention preferably has a glass transition temperature of 55 to 110° C.

In a further aspect, the invention provides a heat-developable photosensitive material in which the polyvinyl acetal resin for heat-developable photosensitive materials according to the present invention is used.

DETAILED DISCLOSURE OF THE INVENTION

In the following, the present invention is described in detail.

The present inventor made intensive investigations concerning the causes of coloration of a heat-developable photosensitive material in which a polyvinyl acetal resin is used, and of the occurrence of fog, poor gradation, insufficient sensitivity and other troubles with images after coating and found that these troubles are caused by the structure of the polyvinyl acetal resin and the minute amounts of impurities resulting from the production. Based on such findings, the present invention has now been completed.

The polyvinyl acetal resin for heat-developable photosensitive materials according to the first aspect of the invention is synthesized by the acetalization reaction between a polyvinyl alcohol and an aldehyde.

The mode of the above acetalization reaction is not particularly restricted but the reaction may be carried out using an acid catalyst in a solution such as an aqueous solution, alcohol solution, water/alcohol mixed solvent solution, or dimethyl sulfoxide (DMSO) solution.

It is to be noted that the above polyvinyl alcohol includes polyvinyl acetate before saponification.

The above aldehyde is not particularly restricted but includes, among others, formaldehyde (inclusive of paraformaldehyde), acetaldehyde (inclusive of paraacetaldehyde), propionaldehyde, butyraldehyde, amylaldehyde, hexylaldehyde, heptylaldehyde, 2-ethylhexylaldehyde, cyclohexylaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde. These aldehydes may be used singly or two or more of them may be used in combination. Among them, acetaldehyde and butyraldehyde are preferred.

The above-mentioned acid catalyst is not particularly restricted but includes, among others, organic acids such as acetic acid and p-toluenesulfonic acid; and inorganic acids such as nitric acid, sulfuric acid and hydrochloric acid. The terminator of above-mentioned acetalization is not particularly restricted, either, but includes, among others, alkaline neutralizing agents such as sodium hydroxide, potassium hydroxide, ammonia, sodium acetate, sodium carbonate, sodium hydrogen carbonate and potassium carbonate; alkylene oxides such as ethylene oxide; and glycidyl ethers such as ethylene glycol diglycidyl ether.

The polyvinyl acetal resin for heat-developable photosensitive materials according to the first aspect of the invention has a degree of polymerization of 200 to 3,000. When it is below 200, the heat-developable photosensitive material obtained will become insufficient in coat strength and, upon bending, the coat may undergo cracking, for instance. When it exceeds 3,000, the dispersibility of the silver salt added to the heat-developable photosensitive material decreases and the applicability of the heat-developable photosensitive material containing such heat-developable photosensitive material component incorporated therein may decrease. The above range is critical for attachment of balanced characteristics of such heat-developable photosensitive material.

In accordance with the second aspect of the invention, the polyvinyl acetal resin for heat-developable photosensitive materials comprises a mixture of a polyvinyl acetal resin lower in molecular weight and a polyvinyl acetal resin higher in molecular weight and the two polyvinyl acetal resin species differ in degree of polymerization by at least 300. The polyvinyl acetal resin for heat-developable photosensitive materials is required only to comprise two polyvinyl acetal resin species differing in degree of polymerization by at least 300 and, thus, it may further comprise another polyvinyl acetal resin species.

The polyvinyl acetal resin for heat-developable photosensitive materials according to the second aspect of the invention may comprise a mixture of two or more polyvinyl acetal resin differing in degree of polymerization by at least 300 or may comprise an acetalization product derived from a polyvinyl alcohol mixture composed of two or more polyvinyl alcohol species differing in degree of polymerization by at least 300.

When the difference in degree of polymerization between the two or more polyvinyl acetal resin or polyvinyl alcohol species to be mixed together is smaller than 300, the dispersibility of the fatty acid silver salt and/or photosensitive silver halide added to the heat-developable photosensitive material will become poor and the coat strength will become weak, so that fog may occur or the gradation may become poor, deteriorating the image characteristics in certain instances.

In the present specification, the degree of polymerization, residual acetyl group content and residual hydroxyl group content of the polyvinyl acetal resin for heat-developable photosensitive materials in accordance with the second aspect of the invention refer to the respective apparent values, namely the values calculated while regarding the resin as consisting of a single composition. Thus, in cases where the resin is composed of two polyvinyl acetal resins A and B, for instance, the values are represented by the following formula:

$$(A1+B1)\log X = A1 \cdot \log A2 + B1 \cdot \log B2$$

wherein
X: apparent degree of polymerization (apparent residual hydroxyl group content, apparent residual acetyl group content) of the polyvinyl acetal resin blend;
A1: weight of polyvinyl acetal resin A;
A2: degree of polymerization (residual hydroxyl group content, residual acetyl group content) of polyvinyl acetal resin A;
B1: weight of polyvinyl acetal resin B;
B2: degree of polymerization (residual hydroxyl group content, residual acetyl group content) of polyvinyl acetal resin B.

The polyvinyl acetal resin for heat-developable photosensitive materials according to the second aspect of the invention has a degree of polymerization of 200 to 1,000. When it is lower than 200, the resulting coat strength will be low and cracking may occur upon bending of the coat. When it exceeds 1,000, the dispersibility of the fatty acid silver salt and photosensitive silver halide may become poor, possibly deteriorating the image characteristics by allowing the occurrence of fog or worsening the gradation. The degree of polymerization of the polyvinyl acetal resin to be admixed or of the polyvinyl alcohol is not particularly restricted but preferably is 200 to 3,000.

As the aldehyde, acid catalyst and terminator to be used for acetalization in the practice of the second aspect of the invention, there may be mentioned the same ones as those to be used in the practice of the first aspect of the invention.

In the acetalization reaction, an antioxidant, such as a hindered phenol, bisphenol or phosphate antioxidant, is generally added to the reaction system and/or product system for preventing the aldehyde in the reaction system from being oxidized or for preventing the product polyvinyl acetal resin from being oxidized and for improving the heat resistance thereof. In the practice of the invention, however, no antioxidant is used, hence the polyvinyl acetal resin of the invention for heat-developable photosensitive materials is free of any antioxidant. Antioxidants may rather deteriorate the pot life of coating solution of the heat-developable photosensitive material and, after application, allow fog to occur in images or deteriorate the visibility of gradated portions.

The polyvinyl acetal resin of the invention for heat-developable photosensitive materials has a specific degree of acetalization. In the present specification, the degree of acetalization is calculated by counting one acetal group as two acetalized hydroxyl groups, since each acetal group in the polyvinyl acetal resin is formed by acetalization of two hydroxyl groups.

The residual acetyl group content of the polyvinyl acetal resin of the invention for heat-developable photosensitive materials is 0 to 25 mole percent. When it exceeds 25 mole percent, the heat-developable photosensitive material films obtained show a tendency toward blocking to each other and, further, the visibility of images is lost, hence the above range is critical. A more preferred range is 0 to 15 mole percent.

The residual hydroxyl group content of the polyvinyl acetal resin of the invention for heat-developable photosensitive materials is 17 to 35 mole percent. When it exceeds 35 mole percent, the dispersibility of the silver salt added to the heat-developable photosensitive materials deceases and, in extreme cases, silver salt aggregation occurs, so that the sensitivity of the resulting heat-developable photosensitive material decreases and, in addition, the resulting heat-developable photosensitive material easily adsorbs moisture, hence the pot life of the heat-developable photosensitive material (coating solution) is shortened. When, conversely, it is smaller than 17 mole percent, the dispersibility of the silver salt becomes low and the sensitivity of the heat-developable photosensitive material decreases. The above range is thus critical. A preferred range if 19 to 30 mole percent.

The water content of the polyvinyl acetal resin of the invention for heat-developable photosensitive material is not more than 2.5% by weight. When it exceeds 2.5% by weight, the pot life of the resulting heat-developable photosensitive material (coating solution) is shortened and, furthermore, the material reacts with crosslinking agent such as an isocyanato group-containing compound, which is added to reinforcing the resulting heat-developable photosensitive material coat, whereby the coat reinforcement by crosslinking may become insufficient or, in extreme cases, impossible. If the level of addition of the crosslinking agent is increased for removing the residual moisture, fog and/or other troubles will be caused and the handleability will become very poor. The above range is thus critical. A preferred range is not more than 2.0% by weight.

As a method of reducing the residual water content to 2.5% by weight or below, there may be mentioned, for example, the method comprising washing with water, a water-alcohol mixed solution and/or the like and then removing water to attain the prescribed level or below by drying with hot air or the like.

The residual aldehyde content of the polyvinyl acetal resin of the invention for heat-developable photosensitive materials is not more than 10 ppm. When it exceeds 10 ppm, the pot life of the heat-developable photosensitive material (coating solution) is shortened, the aldehyde is reduced by the reducing agent contained in the coating solution, the storability of the coating solution decreases and, further, image characteristics are deteriorated by occurrence of fog, hence the above range is critical. These phenomena are thought to be due to the reduction of the residual aldehyde occurring as an impurity in the heat-developable photosensitive material (coating solution) by the reducing agent. Preferably, the residual aldehyde content is not more than 5 ppm.

The means for removing the residual aldehyde occurring as an impurity in the polyvinyl acetal resin is not particularly restricted but, for example, mention may be made of the method comprising washing with water, a water-alcohol mixed solution, or the like.

The glass transition temperature of the polyvinyl acetal resin of the invention for heat-developable photosensitive materials is preferably 55 to 110° C. When it exceeds 110° C., the resulting coat will become too hard and dead folds or cracks may occur upon handling, and/or images on the heat-developable photosensitive material film may show fog, poor gradation or deficient sensitivity. When it is below 55° C., the coat becomes soft, so that it may occur heat-deformation upon heating in the step of development or the coat surface may be damaged upon handling and the damage may cause fog etc. A more preferred range is 55 to 100° C.

A heat-developable photosensitive material can be produced by using the polyvinyl acetal resin according to the invention for heat-developable photosensitive materials. The heat-developable photosensitive material is prepared by compounding the polyvinyl acetal resin according to the invention for heat-developable photosensitive materials, an organic silver salt, a reducing agent, if necessary together with a small amount of a photosensitive silver halide or silver halide-forming component, a crosslinking agent and/or another additive or other additives.

The polyvinyl acetal resin according to the invention for heat-developable photosensitive materials is incorporated in the heat-developable photosensitive material preferably in a ratio to the organic silver salt (polyvinyl acetal resin:organic silver salt) of 1:10 to 10:1, more preferably 1:5 to 5:1.

The above-mentioned organic silver salt is a colorless or white silver salt relatively stable against light and, when heated at 80° C. or above in the presence of a photosensitized silver halide, it reacts with the reducing agent to form metallic silver. As the organic silver salt, there may be mentioned, among others, silver salts of mercaptans such as 3-mercapto-4-phenyl-1,2,4-triazole, 2-mercapto-5-aminothiazole, 1-phenyl-5-mercaptotetrathiazole, 2-mercaptobenzothiazole, mercaptooxadiazole, and mercaptotriazine; silver salts of thione compounds, such as thioamides, thiopyridine, S-2-aminophenyl thiosulfate; silver salts of organic acids, such as aliphatic carboxylic acids, capric acid, lauric acid, myristic acid, palmitic acid, stearic acid, behenic acid, maleic acid, fumaric acid, tartaric acid, furoic acid, linolenic acid, oleic acid, hydroxystearic acid, adipic acid, sebacic acid, succinic acid, acetic acid, butyric acid, camphoric acid, dithioacetic acid and like dithiocarboxylic acids, thioglycolic acid, aromatic carboxylic acids, thionocarboxylic acids, and thioether group-containing aliphatic carboxylic acids; silver salts of imidazoles such as 2-mercaptobenzimidazole; silver salts of triazoles such as benzotriazole; tetrazaindene silver salt; silver-containing metal-amino alcohols; organic acid-silver chelate compounds and so forth. Among these organic silver salts, aliphatic carboxylic acid silver salts are preferred, and silver behenate is more preferred.

The above organic silver salt preferably has a particle size of 0.01 to 10 μm, more preferably 0.1 to 5 μm.

A photosensitive silver halide may catalytically be brought into contact with the above organic silver salt. The means for contacting the photosensitive silver halide is not particularly restricted but mention may be made of, for example, the method comprising reacting the photosensitive silver halide-forming component with a solution or dispersion of the organic silver salt as prepared in advance or with a film containing the organic silver salt to thereby convert part of the organic silver salt to the corresponding silver halide.

The above photosensitive silver halide-forming component is not particularly restricted but may be any one capable of reacting with the organic silver salt to form a silver halide, preferably an iodide ion-containing one. As the silver halide, there may be mentioned, among others, silver bromide, silver iodide, silver chloride, silver chlorobromide, silver iodobromide, silver chloroiodide, etc.

The level of addition of the above photosensitive silver halide is preferably 0.0005 to 0.2 parts by weight, more preferably 0.01 to 0.2 parts by weight, per 100 parts by weight of the organic silver salt.

The above-mentioned reducing agent is not particularly restricted but may be one appropriately selected according to the organic silver salt species employed, among others. For example, it includes substituted phenols, bisphenols, naphthols, bisnaphthols, polyhydroxybenzenes, di- or polyhydroxynaphthols, di- or polyhydroxynaphthalenes, hydroquinones, hydroquinone monoethers, ascorbic acid or derivatives thereof, reducing sugars, aromatic amino compounds, hydroxyamines, hydrazines, phenidones, hindered phenols and so on. Among them, photodecomposable reducing agents are preferred, and thermally decomposable reducing agents are also preferred. More preferred are hindered phenols.

The level of addition of the above reducing agent is preferably 0.0001 to 3.0 parts by weight, more preferably 0.01 to 1.0 part by weight, per 100 parts by weight of the organic silver salt.

Furthermore, the reactions mentioned above can be controlled, for example, by using a photodecomposition-promoting agent in combination with the photodecomposable reducing agent or using a material which has a coat for inhibiting the reaction of the organic silver salt with the reducing agent.

The method of producing the heat-developable photosensitive material according to the invention is not particularly restricted but may comprise, for example, subjecting to the polyvinyl acetal resin according to the invention for heat-developable photosensitive materials, the organic silver salt, the reducing agent and a solvent to mixing up and dispersion treatment in a ball mill, then adding the silver halide or silver halide forming component, if necessary together with an additive or additives, and further causing dispersion to thereby prepare a desired dispersion.

The solvent mentioned above is preferably one capable of dissolving the polyvinyl acetal resin of the invention for heat-developable photosensitive materials and having a low water content. As such solvent, there may be mentioned ketones such as diethyl ketone, methyl ethyl ketone and methyl isobutyl ketone; and esters such as methyl acetate, ethyl acetate and propyl acetate, among others.

The dispersion obtained is then applied to a support in the amount of the organic silver salt to be a predetermined level, and then the solvent is evaporated, whereby a film of the heat-developable photosensitive material is obtained. The heat-developable photosensitive material coat may be formed, on the support, as a monolayer coat of the heat-developable photosensitive material prepared by formulating the polyvinyl acetal resin of the invention for heat-developable photosensitive materials, the organic silver salt and the reducing agent together, as mentioned above, or the coat may be formed by adding the organic silver and reducing agent separately to the polyvinyl acetal resin of the invention for heat-developable photosensitive materials, forming two coat layers from the resulting respective compositions and laying the both one on the other for lamination. The coat maybe formed on one side of the support or on both sides of the support.

The above support is not particularly restricted but includes, among others, plastic films made of polyethylene terephthalate, polyethylene naphthalate, polycarbonate, polyethylene, polypropylene or like polyolefins; polyvinyl acetal, cellulose diacetate, cellulose triacetate or like cellulose esters; nitrocellulose, vinyl chloride resin, chlorinated polypropylene or the like; glass sheets, paper, aluminum sheets and like metal sheets.

The amount of silver dispersed in the coat made of the heat-developable photosensitive material is preferably 0.1 to 5.0 g/m$^2$. When it is smaller than 0.1 g/m$^2$, the image density will be low. If the concentration is increased to above a certain level, the image density will reach a point of saturation and no further improvement will be attained. Even when the silver content is above 5.0 g/m$^2$, the image density will be no more improved. A more preferred range is 0.3 to 3.0 g/m$^2$.

Such heat-developable photosensitive material also constitutes an aspect of the invention.

For image formation using the heat-developable photosensitive material of the invention, a color toner is added. For forming black images, a black color toner is added and, for forming colored images, a color coupler, a leuco dye or the like is added. Further, if necessary, a photosensitizer maybe added to such heat-developable photosensitizer.

BEST MODES FOR CARRYING OUT THE INVENTION

The following examples illustrate the present invention in further detail. These examples are, however, by no means limitative of the scope of the invention.

EXAMPLE 1

<Polyvinyl Acetal Resin Preparation>

Polyvinyl alcohol (100 g) with a degree of polymerization of 500 and a degree of saponification of 98 mole percent was dissolved in 700 g of distilled water with heating. Then while maintaining the solution at 20° C., 29 g of 35% (by weight) hydrochloric acid was added thereto, followed by further addition of 64 g of butyraldehyde. After the start of acetalized resin precipitation, this condition was maintained for 30 minutes, 108 g of the same hydrochloric acid as mentioned above was then added, the temperature was raised to 30° C. and the reaction was allowed to proceed for 10 hours. After completion of the reaction, the solid matter (resin) was washed with distilled water, the washed resin was redispersed in distilled water, and sodium hydroxide was added to the resulting dispersion to thereby adjust the dispersion to pH 7. This dispersion was heated to 50° C. and maintained at this condition for 10 hours and, then, cooled to ordinary temperature.

The rewarmed and washed resin was washed with a 100-fold amount (relative to the solid matter) of distilled water. The resin washed with water was further redispersed in distilled water and the dispersion was maintained at 50° C. for 5 hours, the resin was then further washed with a 100-fold amount of distilled water, dehydrated and dried to give a polyvinyl acetal resin. The polyvinyl acetal resin obtained had a glass transition temperature of 60° C.

The polyvinyl acetal resin obtained was measured for residual acetyl group content, residual hydroxyl group content, residual aldehyde content and water content as well as for storability and heat-developability of a coating solution prepared therefrom, and for developed image storability and heat stability by the methods mentioned below. The measurement results are shown in Table 1.

1. Residual acetyl group content:
   The residual acetyl group content was determined by $^{13}$C-NMR spectrometry.
2. Residual hydroxyl group content:
   The residual hydroxyl group content was determined by $^{13}$C-NMR spectrometry.
3. Residual aldehyde content:
   The polyvinyl acetal resin was thermally extracted in a heating oven and the extract obtained was assayed for aldehyde by gas chromatography.
4. Water content:
   The measurement was made using a Karl Fischer moisture titrator.

<Preparation of a Coating Solution for Heat-Developable Photosensitive Material Film Production>

The above polyvinyl butyral resin (5.0 g) was blended with 5.0 g of silver behenate and 40 g of methyl ethyl ketone in a ball mill for 24 hours. Further, 0.2 g of N-lauryl-1-hydroxy-2-naphthamide was added, and the mixture was again milled and mixed in the ball mill to give a coating solution.

<Storability of the Coating Solution for Heat-Developable Photosensitive Material Film>

The coating solution obtained was allowed to stand at room temperature for 3 days indoors under a fluorescent lamp, and then examined for coloration or no coloration of the coating solution. The coating solution after fluorescent lamp exposure showed no change in whiteness as compared with the condition before exposure. The evaluation criteria for the storability of the coating solution were was follows; ○—no change in color of the solution, Δ—slight coloration, X—significant change in color.

<Heat-Developable Photosensitive Material Film Production>

The above coating solution was applied to a support consisting of a polyester film so that the thickness after drying amounted to 10 μm. The coat was then dried. To the coat surface was applied a solution composed of 0.5 g of N,N-dimethyl-p-phenylenediamine lead sulfate, 2 g of polyvinylpyrrolidone and 30 ml of methanol to a thickness after drying of 1 μm, followed by drying. A heat-developable photosensitive material film was thus produced.

<Heat-Developability of the Heat-Developable Photosensitive Material Film>

For evaluating the heat-developability thereof, the heat-developable photosensitive material film obtained was exposed to light at a distance of 20 cm from a 250 watt high-pressure mercury lamp through a gradated pattern film for 0.3 seconds, then heated for development for 5 seconds using a hot plate at 120° C., whereby a good patterned image with a cyan color was obtained. On that occasion, the evaluation was made as follows: ○—no fog, and good visibility; Δ—slight fog, hence poor in visibility; X—a large number of fogs, and bad visibility.

<Developed Image Storability>

Then, for confirming the storability thereof, the developed image was exposed to white light for 24 hours. The evaluation criteria were as follows: ○—no disturbance observed in image pattern contrast; Δ—slight disturbance in image pattern contrast; X—remarkable disturbance in image pattern contrast.

<Heating Stability>

The heat-developable photosensitive material film obtained in the above manner was placed on a stainless steel plate, which had an irregular surface with 1-mm-high protrusions disposed at 1-mm intervals and was maintained at 100° C., so that the coat layer of the film might come into contact with the plate, and the heat-developable photosensitive material film was then pressed against the stainless steel plate at a pressure of 100 g/cm$^2$ for 5 seconds. The heat-developable photosensitive material film was then cooled at ordinary temperature and the coat surface of the heat-developable photosensitive material film was evaluated by visual observation, as follows: ○—there was neither cracking nor deformation; X—cracking or deformation was found.

EXAMPLE 2

A polyvinyl butyral resin was prepared in the same manner as in Example 1 except that the polyvinyl alcohol used had a degree of polymerization of 500 and a degree of saponification of 88 mole percent. Using this resin, a heat-developable photosensitive material film was produced in the same manner. The polyvinyl butyral resin had a glass transition temperature of 56° C. The polyvinyl butyral resin prepared and the heat-developable photosensitive material film obtained were tested and evaluated in the same manner as in Example 1. As a result, the coating solution storability, heat-developability, developed image storability and heating stability were all good, as in Example 1. The test results and so forth are shown in Table 1.

EXAMPLE 3

A heat-developable photosensitive material film was produced in the same manner as in Example 1 except that a polyvinyl butyral resin having a degree of polymerization of 240, a residual acetyl group content of 1.5 mole percent, a residual hydroxyl group content of 27 mole percent, a residual aldehyde content of 3 ppm and a water content of 1.5% by weight was used. The polyvinyl butyral resin had a glass transition temperature of 62° C. The polyvinyl butyral resin prepared and the heat-developable photosensitive material film obtained were tested and evaluated in the same manner as in Example 1. As a result, the coating solution storability, heat-developability, developed image storability and heating stability were all good, as in Example 1. The test results and so forth are shown in Table 1.

EXAMPLE 4

Polyvinyl alcohol (132 g) with a degree of polymerization of 300 and a degree of saponification of 98 mole percent was dissolved in 1,600 g of distilled water with heating. Then while maintaining the solution at 20° C., 110 g of 35% (by weight) hydrochloric acid was added thereto, followed by further addition of 30 g of acetaldehyde. The mixture was cooled to 12° C., and 40 g of butyraldehyde was then added. After the start of acetalized resin precipitation, this condition was maintained for 30 minutes, the temperature was then raised to 60° C. and the reaction was allowed to proceed for 4 hours. After completion of the reaction, the solid matter (resin) was washed with distilled water, the washed resin was redispersed in distilled water, and sodium hydrogen carbonate was added to the resulting dispersion to thereby adjust the dispersion to pH 8. This dispersion was heated to 60° C. and maintained at this condition for 5 hours and, then, cooled to ordinary temperature.

The rewarmed and washed resin was washed with a 100-fold amount (relative to the solid matter) of distilled water. The resin washed with water was further redispersed in distilled water and the dispersion was maintained at 50° C. for 5 hours, the resin was then further washed with a 100-fold amount of distilled water, dehydrated and dried to give a polyvinyl acetal resin. This polyvinyl acetal resin had a glass transition temperature of 80° C.

Using the thus-prepared polyvinyl acetal resin, a heat-developable photosensitive material film was produced in the same manner as in Example 1. The polyvinyl acetal resin prepared and the heat-developable photosensitive material film obtained were tested in the same manner as in Example 1. As a result, the coating solution storability, heat-developability, developed image storability and heating stability were all good, as in Example 1. The test results and so forth are shown in Table 1.

EXAMPLE 5

A heat-developable photosensitive material film was produced in the same manner as in Example 1 except that a polyvinyl acetal resin having a degree of polymerization of 240, a residual acetyl group content of 11 mole percent, a residual hydroxyl group content of 21 mole percent, a degree of acetacetalization of 35 mole percent, a degree of butyral formation of 33 mole percent, a residual aldehyde content of 3 ppm, a water content of 1.5% by weight and a glass transition temperature of 70° C. was used.

The polyvinyl acetal resin used and the heat-developable photosensitive material film obtained were tested in the same manner as in Example 1. As a result, the coating solution storability, heat-developability, developed image storability and heating stability were all good, as in Example 1. The test results and so forth are shown in Table 1.

EXAMPLE 6

A heat-developable photosensitive material film was produced in the same manner as in Example 1 except that a polyvinyl acetal resin having a degree of polymerization of 240, a residual acetyl group content of 1 mole percent, a residual hydroxyl group content of 32 mole percent, a degree of acetacetalization of 35 mole percent, a degree of butyralization of 32 mole percent, a residual aldehyde content of 3 ppm, a water content of 1.5% by weight and a glass transition temperature of 76° C. was used.

The polyvinyl acetal resin used and the heat-developable photosensitive material film obtained were tested in the same manner as in Example 1. As a result, the coating solution storability, heat-developability, developed image storability and heating stability were all good, as in Example 1. The test results and so forth are shown in Table 1.

EXAMPLE 7

A heat-developable photosensitive material film was produced in the same manner as in Example 1 except that a polyvinyl acetal resin having a degree of polymerization of 240, a residual acetyl group content of 1 mole percent, a residual hydroxyl group content of 25 mole percent, a degree of acetacetalization of 73 mole percent, a degree of butyralization of 1 mole percent, a residual aldehyde content of 3 ppm, a water content of 1.5% by weight and a glass transition temperature of 103° C. was used.

The polyvinyl acetal resin used and the heat-developable photosensitive material film obtained were tested in the same manner as in Example 1. As a result, the coating solution storability, heat-developability and developed image storability were all good, as in Example 1. The test results and so forth are shown in Table 1.

EXAMPLE 8

A heat-developable photosensitive material film was produced in the same manner as in Example 1 except that a polyvinyl acetal resin having a degree of polymerization of 240, a residual acetyl group content of 12 mole percent, a residual hydroxyl group content of 22 mole percent, a degree of acetacetalization of 63 mole percent, a degree of butyralization of 1 mole percent, a residual aldehyde content of 3 ppm, a water content of 1.5% by weight and a glass transition temperature of 93° C. was used.

The polyvinyl acetal resin used and the heat-developable photosensitive material film obtained were tested in the same manner as in Example 1. As a result, the coating solution storability, heat-developability, developed image storability and heating stability were all good, as in Example 1. The test results and so forth are shown in Table 1.

EXAMPLE 9

A heat-developable photosensitive material film was produced in the same manner as in Example 1 except that a polyvinyl acetal resin having a degree of polymerization of 240, a residual acetyl group content of 1 mole percent, a residual hydroxyl group content of 24 mole percent, a degree of acetacetalization of 75 mole percent, a residual aldehyde content of 3 ppm, a water content of 1.5% by weight and a glass transition temperature of 109° C. was used.

The polyvinyl acetal resin used and the heat-developable photosensitive material film obtained were tested in the same manner as in Example 1. As a result, the coating solution storability, heat-developability, developed image storability and heating stability were all good, as in Example 1. The test results and so forth are shown in Table 1.

COMPARATIVE EXAMPLE 1

A heat-developable photosensitive material film was produced in the same manner as in Example 1 except that the water content was 5% by weight. The polyvinyl acetal resin used and the heat-developable photosensitive material film obtained were tested in the same manner as in Example 1. The dispersibility of the organic silver salt in the coating solution was poor, and the image on the heat-developable photosensitive material film after light exposure showed indistinct pattern boundaries. The test results and so forth are shown in Table 2.

COMPARATIVE EXAMPLE 2

A heat-developable photosensitive material film was produced in the same manner as in Example 1 except that 500 ppm of 2,2'-methylenebis (4-ethyl-6-tert-butylphenol) was added as an antioxidant to the same polyvinyl acetal resin as used in Example 1.

The polyvinyl acetal resin used and the heat-developable photosensitive material film obtained were tested in the same manner as in Example 1. The coating solution showed marked coloration, and the heat-developable photosensitive material film after light exposure revealed a number of fogs. The test results and so forth are shown in Table 2.

COMPARATIVE EXAMPLE 3

A heat-developable photosensitive material film was produced in the same manner as in Example 1 except that a polyvinyl acetal resin having a degree of polymerization of 500, a residual acetyl group content of 1.5 mole percent, a residual hydroxyl group content of 38 mole percent, a degree of acetacetalization of 75 mole percent, a residual aldehyde content of 3 ppm, a water content of 1.5% by weight and a glass transition temperature of 60° C. was used.

The polyvinyl acetal resin used and the heat-developable photosensitive material film obtained were tested in the same manner as in Example 1. Although the coating solution showed no coloration, a plurality of the heat-developable photosensitive material films, when stored in a stacked condition, underwent blocking at 35° C., and the image on the heat-developable photosensitive material film after light exposure showed indistinct pattern boundaries. The test results and so forth are shown in Table 2.

COMPARATIVE EXAMPLE 4

A heat-developable photosensitive material film was produced in the same manner as in Example 1 except that the same polyvinyl acetal resin as used in Example 4 was used and the water content thereof was 5% by weight. The polyvinyl acetal resin used and the heat-developable photosensitive material film obtained were tested in the same manner as in Example 1. The dispersibility of the organic silver salt in the coating solution was poor, and the image on the heat-developable photosensitive material film after light exposure showed indistinct pattern boundaries. The test results and so forth are shown in Table 2.

COMPARATIVE EXAMPLE 5

A heat-developable photosensitive material film was produced in the same manner as in Example 1 except that the same polyvinyl acetal resin as used in Example 4 was used and 500 ppm of 2,2'-methylenebis(4-ethyl-6-t-butylphenol) was added thereto as an antioxidant. The polyvinyl acetal resin used and the heat-developable photosensitive material film obtained were tested in the same manner as in Example 1. The coating solution showed marked coloration, and the heat-developable photosensitive material film after light exposure revealed a large number of fogs. The test results and so forth are shown in Table 2.

COMPARATIVE EXAMPLE 6

A heat-developable photosensitive material film was produced in the same manner as in Example 1 using the same polyvinyl acetal resin as used in Example 4 except that this had a residual hydroxyl group content of 38 mole percent, a degree of acetacetalization of 31 mole percent, a degree of butyralization of 29.5 mole percent.

The polyvinyl acetal resin used and the heat-developable photosensitive material film obtained were tested in the same manner as in Example 1. Although the coating solution showed no coloration, a plurality of the heat-developable photosensitive material films, when stored in a stacked condition, underwent blocking at 35° C., and the image on the heat-developable photosensitive material film after-light exposure showed indistinct pattern boundaries. The test results and so forth are shown in Table 2.

COMPARATIVE EXAMPLE 7

A heat-developable photosensitive material film was produced in the same manner as in Example 1 except that a polyvinyl acetal resin having a degree of polymerization of 500, a residual acetyl group content of 1.0 mole percent, a residual hydroxyl group content of 37 mole percent, a degree of formalization of 62 mole percent, a residual aldehyde content of 3 ppm, a water content of 1.5% by weight and a glass transition temperature of 130° C. was used.

The polyvinyl acetal resin used and the heat-developable photosensitive material film obtained were tested in the same manner as in Example 1. The coating solution showed slight coloration, and the heat-developable photosensitive material film after light exposure revealed slight fog. As for the heating stability, fine cracks occurred on the coat surface.

COMPARATIVE EXAMPLE 8

A heat-developable photosensitive material film was produced in the same manner as in Example 1 except that a polyvinyl acetal resin having a degree of polymerization of 500, a residual acetyl group content of 1.0 mole percent, a residual hydroxyl group content of 37 mole percent, a degree of hexylacetalization of 62 mole percent, a residual aldehyde content of 3 ppm, a water content of 1.5% by weight and a glass transition temperature of 50° C. was used.

The polyvinyl hexylacetal resin used and the heat-developable photosensitive material film obtained were tested in the same manner as in Example 1. The coating solution showed slight coloration, and the heat-developable photosensitive material film-obtained after light exposure revealed slight fog. As for the heating stability, heating caused deformation.

COMPARATIVE EXAMPLE 9

A heat-developable photosensitive material film was produced in the same manner as in Example 1 using the same polyvinyl acetal resin as used in Example 1 except that the residual aldehyde content was 200 ppm.

The polyvinyl acetal resin used and the heat-developable photosensitive material film obtained were tested in the same manner as in Example 1. The coating solution showed slight coloration, and fogs were observed on the heat-developable photosensitive material film after light exposure. The test results and so forth are shown in Table 2.

COMPARATIVE EXAMPLE 10

A heat-developable photosensitive material film was produced in the same manner as in Example 1 using the same polyvinyl acetal resin as used in Example 4 except that the residual aldehyde content was 200 ppm.

The polyvinyl acetal resin used and the heat-developable photosensitive material film obtained were tested in the same manner as in Example 1. The coating solution showed slight coloration, and fogs were observed on the heat-developable photosensitive material film after light exposure. The test results and so forth are shown in Table 2.

TABLE 1

|  |  | Example |  |  |  |  |  |  |  |  |
|---|---|---|---|---|---|---|---|---|---|---|
|  |  | 1 | 2 | 3 | 4 | 5 | 6 | 7 | 8 | 9 |
| Polyvinyl acetal resin | Degree of polymerization | 500 | 500 | 240 | 300 | 240 | 240 | 240 | 240 | 240 |
|  | Residual acetyl group content (mol %) | 1.7 | 11 | 1.5 | 1.5 | 11 | 1 | 1 | 12 | 1 |
|  | Residual hydroxyl group content (mol %) | 21 | 21 | 27 | 24.5 | 21 | 32 | 25 | 22 | 24 |
|  | Residual aldehyde content (ppm) | 3 | 3 | 3 | 1.5 | 3 | 3 | 3 | 3 | 3 |
|  | Water content (wt %) | 1.5 | 1.5 | 1.5 | 2.0 | 1.5 | 1.5 | 1.5 | 1.5 | 1.5 |
|  | Aldehyde species *1 | B | B | B | AB | AB | AB | AB | AB | A |
|  | Glass transition temperature (° C.) | 60 | 56 | 62 | 80 | 70 | 76 | 103 | 93 | 109 |
|  | Antioxidant addition | No | No | No | No | No | No | No | No | No |
| Performance characteristics | Coating solution storability | ○ | ○ | ○ | ○ | ○ | ○ | ○ | ○ | ○ |
|  | Heat-developability | ○ | ○ | ○ | ○ | ○ | ○ | ○ | ○ | ○ |
|  | Developed image storability | ○ | ○ | ○ | ○ | ○ | ○ | ○ | ○ | ○ |
|  | Heating stability | ○ | ○ | ○ | ○ | ○ | ○ | ○ | ○ | ○ |

*1: A = acetaldehyde, B = butyraldehyde, AB = A plus B.

TABLE 2

|  |  | Comparative Example |  |  |  |  |  |  |  |  |  |
|---|---|---|---|---|---|---|---|---|---|---|---|
|  |  | 1 | 2 | 3 | 4 | 5 | 6 | 7 | 8 | 9 | 10 |
| Polyvinyl acetal resin | Degree of polymerization | 500 | 500 | 500 | 300 | 300 | 300 | 500 | 500 | 500 | 500 |
|  | Residual acetyl group content (mol %) | 1.7 | 1.7 | 1.5 | 1.5 | 1.5 | 1.5 | 1.0 | 1.0 | 1.7 | 1.5 |
|  | Residual hydroxyl group content (mol %) | 21 | 21 | 38 | 24.5 | 24.5 | 38 | 37 | 37 | 21 | 24.5 |
|  | Residual aldehyde content (ppm) | 3 | 3 | 3 | 1 | 1 | 1 | 3 | 3 | 200 | 200 |
|  | Water content (wt %) | 5 | 1.5 | 1.5 | 5 | 2.0 | 2.0 | 1.5 | 1.5 | 1.5 | 2.0 |
|  | Aldehyde species *1 | B | B | B | AB | AB | AB | C | D | B | AB |
|  | Glass transition temperature (° C.) | 60 | 60 | 60 | 80 | 80 | 80 | 130 | 50 | 60 | 80 |
|  | Antioxidant addition | No | Yes | No | No | Yes | No | No | No | No | No |
| Performance characteristics | Coating solution storability | Δ | X | X | Δ | X | X | Δ | Δ | Δ | Δ |
|  | Heat-developability | X | X | Δ | X | X | X | Δ | Δ | Δ | Δ |
|  | Developed image storability | — | — | — | — | — | — | — | — | — | — |
|  | Heating stability | ○ | ○ | ○ | ○ | ○ | ○ | X | X | ○ | ○ |

*1: A = acetaldehyde, B = butyraldehyde, AB = A plus B, C = formaldehyde, D = hexyl aldehyde.

EXAMPLE 10

<Polyvinyl Acetal Resin Preparation>

Polyvinyl alcohol (100 g) with a degree of polymerization of 300 and a degree of saponification of 98 mole percent was dissolved in 700 g of distilled water with heating. Then, while maintaining the solution at 20° C., 29 g of 35% (by weight) hydrochloric acid was added thereto, followed by further addition of 64 g of butyraldehyde. After resin precipitation, this condition was maintained for 30 minutes, 108 g of the same hydrochloric acid as mentioned above was then added, the temperature was raised to 30° C. and maintained at this level for 10 hours. After completion of the reaction, the resin was washed with distilled water, the washed polyvinyl butyral resin was dispersed in water, and sodium hydroxide was added to the mixture to thereby adjust the pH to 7. The mixture was maintained at 50° C. for 10 hours and then cooled. The mixture was washed with a 100-fold amount (relative to the solid matter) of distilled water, then further maintained at 50° C. for 5 hours, and washed with a 100-fold amount of distilled water, followed by dehydration and drying to give a polyvinyl acetal resin.

Separately, 100 g of polyvinyl alcohol with a degree of polymerization of 650 and a degree of saponification of 98 mole percent was dissolved in 700 g of distilled water with warming and, thereafter, the solution was treated in the same manner as mentioned above to give a polyvinyl acetal resin.

<Preparation of a Coating Solution for Heat-Developable Photosensitive Material Film Production>

Silver behenate (5.0 g), 5.0 g of a polyvinyl acetal resin and 40 g of methyl ethyl ketone were blended up in a ball mill for 24 hours. Further, 0.2 g of N-lauryl-1-hydroxy-2-naphthamide was added, and the mixture was again milled and mixed in the ball mill to give a coating solution.

The polyvinyl acetal resin used was a blend of the polyvinyl acetal resin having a degree of polymerization of 300 and that having a degree of polymerization of 650 in a weight ratio of 1:1. The resin blend to be used above had an apparent degree of polymerization of 440, an apparent hydroxyl group content of 21 mole percent, and an apparent acetyl group content of 1.7 mole percent.

EXAMPLES 11 to 16

Comparative Examples 11 to 14

Coating solutions for heat-developable photosensitive material film production were prepared in the same manner as in Example 10 except that the degrees of degree of polymerization s of saponification, aldehyde species, degrees of acetalization, hydroxyl group contents and blending ratio of the polyvinyl acetal resins were varied as specified in Table 3.

EXAMPLE 17

Polyvinyl alcohol (50 g) having a degree of polymerization of 300 and a degree of saponification of 98 mole percent and 50 g of polyvinyl alcohol having a degree of polymerization of 650 and a degree of saponification of 98 mole percent were dissolved in 700 g of distilled water with warming, and the solution was treated in the same manner as in Example 10 to give a polyvinyl acetal resin.

Then, using the polyvinyl acetal resin obtained, a coating solution for heat-developable photosensitive material film production was prepared in the same manner as in Example 10.

EXAMPLES 18 TO 23

Comparative Examples 15 AND 16

Coating solutions for heat-developable photosensitive material film production were prepared in the same manner as in Example 17 except that the degrees of degree of polymerization s of saponification, aldehyde species, degrees of acetalization, hydroxyl group contents and blending ratio of the polyvinyl acetal resins were varied as specified in Table 4.

The polyvinyl acetal resins obtained in Examples 10 to 23 and Comparative Examples 11 to 16 were measured and evaluated for residual acetyl group content, residual hydroxyl group content, residual aldehyde content and water content in the same manner as in Example 1. The results are shown in Table 3 for Examples 10 to 16 and Comparative Examples 11 to 14 and in Table 4 for Examples 17 to 23 and Comparative Examples 15 and 16.

The apparent degree of polymerization, apparent hydroxyl group content and apparent acetyl group content were calculated according to the following formula:

$$(A1+B1)\log X = A1 \cdot \log A2 + B1 \cdot \log B2$$

wherein

X: apparent degree of polymerization (apparent residual hydroxyl group content, apparent residual acetyl group content) of the polyvinyl acetal resin blend;

A1: weight of polyvinyl acetal resin A;

A2: degree of polymerization (residual hydroxyl group content, residual acetyl group content) of polyvinyl acetal resin A;

B1: weight of polyvinyl acetal resin B;

B2: degree of polymerization (residual hydroxyl group content, residual acetyl group content) of polyvinyl acetal resin B.

The coating solutions for heat-developable photosensitive material film production were evaluated for storability in the same manner as in Example 1. Further, heat-developable photosensitive material films were produced in the same manner as in Example 1 and subjected to the evaluations mentioned below. The results are shown in Table 3 for Examples 10 to 16 and Comparative Examples 11 to 14, and in Table 4 for Examples 17 to 23 and Comparative Examples 15 and 16.

<Heat-Developability of the Heat-Developable Photosensitive Material Films>

For evaluating the heat-developability thereof, the heat-developable photosensitive material films obtained were exposed to light at a distance of 20 cm from a 250 watt high-pressure mercury lamp through a gradated pattern film for 0.3 millisecond, then heated for development for 5 seconds using a hot plate at 110° C., whereby good patterned images with a cyan color was obtained. On that occasion, the evaluation was made as follows: ○—no fog, and good visibility; Δ—slight fog, hence poor in visibility; X—a large number of fogs, and bad visibility.

<Developed Image Storability>

Then, for confirming the storability thereof, the developed images were exposed to white light for 24 hours. The evaluation criteria were as follows: ○—no disturbance observed in image pattern contrast; Δ—slight disturbance in image pattern contrast; X—remarkable disturbance in image pattern contrast.

<Heating Stability>

The heat-developable photosensitive material films obtained in the above manner each was placed on a stainless steel plate, which had an irregular surface with 1-mm-high protrusions disposed at 1-mm intervals and was maintained at 100° C., so that the coat layer of the film might come into contact with the plate, and the heat-developable photosensitive material film was then pressed against the stainless steel plate at a pressure of 150 g/cm$^2$ for 5 seconds. The heat-developable photosensitive material was then cooled at ordinary temperature and the coat surface of the heat-developable photosensitive material film was evaluated by visual observation, as follows: ○—there was neither cracking nor deformation; X—cracking or deformation was found.

TABLE 3

| | | Method of blending | | Polyvinyl actual resin | | | | | |
| --- | --- | --- | --- | --- | --- | --- | --- | --- | --- |
| | | PVA blending | Actual resin blending | Degree of polymerization | Degree of saponification (mol %) | Residual acetyl group content (mol %) | Residual hydroxyl group content (mol %) | Residual aldehyde content (ppm) | Water content (wt %) | Aldehyde species *1 |
| Example | 10 | — | ○ | 300 | 98 | 1.7 | 21 | 3 | 1.5 | B |
| | | | | 650 | 98 | 1.7 | 21 | 3 | 1.5 | B |
| | 11 | — | ○ | 300 | 98 | 1.7 | 21 | 3 | 1.5 | B |
| | | | | 650 | 98 | 1.7 | 31 | 3 | 1.5 | B |
| | 12 | — | ○ | 250 | 98 | 1.7 | 21 | 3 | 1.5 | B |
| | | | | 700 | 88 | 12 | 30 | 3 | 1.5 | B |

TABLE 3-continued

|  |  |  |  |  |  |  |  |  |  |  |
|---|---|---|---|---|---|---|---|---|---|---|
|  | 13 | — | ○ | 300 | 88 | 12 | 30 | 3 | 1.5 | B |
|  |  |  |  | 650 | 88 | 12 | 30 | 3 | 1.5 | B |
|  | 14 | — | ○ | 300 | 98 | 1.7 | 28 | 3 | 2 | AB |
|  |  |  |  | 850 | 98 | 1.7 | 28 | 3 | 2 | AB |
|  | 15 | — | ○ | 250 | 98 | 1.7 | 21 | 3 | 1.5 | B |
|  |  |  |  | 700 | 98 | 1.7 | 28 | 3 | 1.5 | AB |
|  | 16 | — | ○ | 300 | 98 | 1.7 | 25 | 3 | 2 | A |
|  |  |  |  | 800 | 98 | 1.7 | 34 | 3 | 1.5 | B |
| Comparative | 11 | — | — | 500 | 98 | 1.7 | 21 | 3 | 6 | B |
| Example | 12 | — | — | 500 | 98 | 1.7 | 21 | 3 | 1.5 | B |
|  | 13 | — | — | 500 | 98 | 1.7 | 38 | 3 | 1.5 | B |
|  | 14 | — | ○ | 500 | 98 | 1.7 | 21 | 3 | 1.5 | B |
|  |  |  |  | 450 | 98 | 1.7 | 21 | 3 | 1.5 | B |

| | | | Polyvinyl actual resin | | | | | | |
|---|---|---|---|---|---|---|---|---|---|
| | | Glass | | Apparent | Apparent residual acetyl | Apparent residual hydroxyl | Performance characteristics | | | |
| | | transition temperature (° C.) | Antioxidant addition | Apparent degree of polymerization | group content (mol %) | group content (mol %) | Coating solution storability | Heat-develop-ability | Developed image storability | Heating stability |
| Example | 10 | 60 | No | 440 | 1.7 | 21 | ○ | ○ | ○ | ○ |
|  |  | 60 | No |  |  |  |  |  |  |  |
|  | 11 | 60 | No | 440 | 1.5 | 25.6 | ○ | ○ | ○ | ○ |
|  |  | 62 | No |  | 1.7 |  |  |  |  |  |
|  | 12 | 60 | No | 420 | 4.5 | 25.1 | ○ | ○ | ○ | ○ |
|  |  | 59 | No |  |  |  |  |  |  |  |
|  | 13 | 59 | No | 440 | 12 | 30 | ○ | ○ | ○ | ○ |
|  |  | 59 | No |  |  |  |  |  |  |  |
|  | 14 | 78 | No | 440 | 1.7 | 28 | ○ | ○ | ○ | ○ |
|  |  | 85 | No |  |  |  |  |  |  |  |
|  | 15 | 60 | No | 420 | 1.7 | 24.2 | ○ | ○ | ○ | ○ |
|  |  | 87 | No |  |  |  |  |  |  |  |
|  | 16 | 105 | No | 490 | 1.7 | 29.2 | ○ | ○ | ○ | ○ |
|  |  | 62 | No |  |  |  |  |  |  |  |
| Comparative | 11 | 60 | No | 500 | — | — | Δ | X | X | X |
| Example | 12 | 60 | Yes | 500 | — | — | X | X | X | X |
|  | 13 | 63 | No | 500 | — | — | X | Δ | X | X |
|  | 14 | 60 | No | 475 | 1.7 | 21 | ○ | Δ | ○ | X |
|  |  | 60 | No |  |  |  |  |  |  |  |

*1: A = acetaldehyde, B = butyraldehyde, AB = A plus B.

TABLE 4

| | | Method of blending | | Polyvinyl alcohol | | Polyvinyl actual resin | | | | |
|---|---|---|---|---|---|---|---|---|---|---|
| | | PVA blending | Actual resin blending | Degree of polymerization | Degree of saponification (mol %) | Residual acetyl group content (mol %) | Residual hydroxyl group content (mol %) | Residual aldehyde content (ppm) | Water content (wt %) | Aldehyde species *1 |
| Example | 17 | ○ | — | 300 | 98 | 1.7 | 21 | 3 | 1.5 | B |
|  |  |  |  | 650 | 98 |  |  |  |  |  |
|  | 18 | ○ | — | 300 | 98 | 1.7 | 30 | 3 | 1.5 | B |
|  |  |  |  | 650 | 98 |  |  |  |  |  |
|  | 19 | ○ | — | 250 | 98 | 4.5 | 25 | 3 | 1.5 | B |
|  |  |  |  | 700 | 88 |  |  |  |  |  |
|  | 20 | ○ | — | 300 | 88 | 12 | 30 | 3 | 1.5 | B |
|  |  |  |  | 650 | 88 |  |  |  |  |  |
|  | 21 | ○ | — | 300 | 98 | 1.7 | 28 | 3 | 2 | AB |
|  |  |  |  | 650 | 98 |  |  |  |  |  |
|  | 22 | ○ | — | 250 | 98 | 1.7 | 33 | 3 | 1.5 | AB |
|  |  |  |  | 700 | 98 |  |  |  |  |  |
|  | 23 | ○ | — | 300 | 98 | 1.7 | 25 | 3 | 2 | A |
|  |  |  |  | 800 | 98 |  |  |  |  |  |
| Comparative | 15 | ○ | — | 500 | 98 | 1.7 | 21 | 3 | 1.5 | B |
| Example |  |  |  | 450 | 98 |  |  |  |  |  |
|  | 16 | ○ | — | 300 | 88 | 12 | 31 | 3 | 1.5 | B |
|  |  |  |  | 400 | 88 |  |  |  |  |  |

TABLE 4-continued

|  |  | Polyvinyl actual resin | | | | | | | |
|---|---|---|---|---|---|---|---|---|---|
|  |  | Glass transition temperature (° C.) | Antioxidant addition | Apparent degree of polymerization | Apparent residual acetyl group content (mol %) | Apparent residual hydroxyl group content (mol %) | Performance characteristics | | | |
|  |  |  |  |  |  |  | Coating solution storability | Heat-developability | Developed image storability | Heating stability |
| Example | 17 | 60 | No | 440 | 1.7 | 21 | ○ | ○ | ○ | ○ |
|  | 18 | 60 | No | 440 | 1.7 | 30 | ○ | ○ | ○ | ○ |
|  | 19 | 60 | No | 420 | 4.5 | 25 | ○ | ○ | ○ | ○ |
|  | 20 | 59 | No | 440 | 12 | 30 | ○ | ○ | ○ | ○ |
|  | 21 | 80 | No | 440 | 1.7 | 28 | ○ | ○ | ○ | ○ |
|  | 22 | 87 | No | 420 | 1.7 | 33 | ○ | ○ | ○ | ○ |
|  | 23 | 105 | No | 490 | 1.7 | 25 | ○ | ○ | ○ | ○ |
| Comparative Example | 15 | 60 | No | 475 | 1.7 | 21 | ○ | Δ | ○ | X |
|  | 16 | 59 | No | 347 | 12 | 31 | ○ | Δ | ○ | X |

*1: A = acetaldehyde, B = butyraldehyde, AB = A plus B.

In Comparative Example 11, the water content in the polyvinyl acetal resin was high, so that the dispersibility of the organic silver salt in the coating solution was poor; as a result, the heat-developability and image storability were poor. In Comparative Example 12, the polyvinyl acetal resin contained the antioxidant incorporated, so that the coating solution was poor in storability and the heat-developability was also poor. In Comparative Example 13, the residual hydroxyl group content was high, hence the dispersibility was poor; owing to moisture absorption, the image storability was also poor. In Comparative Examples 14 to 16, the heat-developability and heating stability were inferior, although the coating solution storability was good.

On the other hand, in Examples 10 to 23, in which the factors concerned were controlled within the respective specific ranges according to the invention, heat-developable photosensitive material films excellent in all of coating solution storability, heat-developability, developed image storability and heating stability could be obtained.

Industrial Applicability

The invention, which has the constitution mentioned above, can provide heat-developable photosensitive materials excellent in storability and particularly excellent also in image characteristics and, further, immune to coat folding or cracking during handling or to heat-deformation during heat-development.

What is claimed is:

1. A polyvinyl acetal resin for heat-developable photosensitive materials
   which is a polyvinyl acetal resin synthesized by the acetalization reaction between a polyvinyl alcohol and an aldehyde and
   which comprises having a degree of polymerization of 200 to 3,000, a residual acetyl group content of 0 to 25 mole percent and a residual hydroxyl group content of 17 to 35 mole percent, as calculated while regarding one acetal group as two acetalized hydroxyl groups, a water content of not more than 2.5% by weight and a residual aldehyde content of not more than 10 ppm and is free of any antioxidant.

2. A polyvinyl acetal resin for heat-developable photosensitive materials
   which comprises two polyvinyl acetal resin species differing in degree of polymerization by at least 300 and
   which comprises having an apparent degree of polymerization of 200 to 1,000, an apparent residual acetyl group content of 0 to 25 mole percent and an apparent residual hydroxyl group content of 17 to 35 mole percent, as calculated while regarding one acetal group as two acetalized hydroxyl groups, a water content of not more than 2.5% by weight and a residual aldehyde content of not more than 10 ppm and is free of any antioxidant.

3. A heat-developable photosensitive material
   in which the polyvinyl acetal resin for heat-developable photosensitive material according to claim 1 is used.

4. A heat-developable photosensitive material
   in which the polyvinyl acetal resin for heat-developable photosensitive material according to claim 2 is used.

* * * * *